United States Patent
Shaikh et al.

(10) Patent No.: US 8,900,529 B2
(45) Date of Patent: Dec. 2, 2014

(54) MICROFLUIDIC CHAMBER DEVICE AND FABRICATION

(75) Inventors: Kashan Ali Shaikh, Clifton Park, NY (US); Jessica Marie Godin, Niskayuna, NY (US); Alex David Corwin, Niskayuna, NY (US); Robert John Filkins, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 220 days.

(21) Appl. No.: 13/458,092

(22) Filed: Apr. 27, 2012

(65) Prior Publication Data

US 2013/0287645 A1 Oct. 31, 2013

(51) Int. Cl.
*B01L 99/00* (2010.01)

(52) U.S. Cl.
USPC ............................................ 422/503; 422/504

(58) Field of Classification Search
CPC .............. B01L 2300/0816; B01L 2300/0887; B01L 3/5027; B01L 3/502738
USPC ................................................. 422/503, 504
See application file for complete search history.

(56) References Cited

U.S. PATENT DOCUMENTS

| | | | |
|---|---|---|---|
| 5,147,606 A * | 9/1992 | Charlton et al. ............. 422/412 |
| 6,443,179 B1 | 9/2002 | Benavides et al. | |
| 6,494,614 B1 | 12/2002 | Bennett et al. | |
| 6,499,499 B2 | 12/2002 | Dantsker et al. | |
| 6,503,359 B2 | 1/2003 | Virtanen | |
| 6,509,085 B1 | 1/2003 | Kennedy | |
| 6,729,352 B2 | 5/2004 | O'Connor et al. | |
| 6,827,095 B2 | 12/2004 | O'Connor et al. | |
| 7,028,536 B2 | 4/2006 | Karp et al. | |
| 7,235,400 B2 | 6/2007 | Adey | |
| 7,927,865 B2 | 4/2011 | Meathrel et al. | |
| 2008/0202694 A1 | 8/2008 | Serbicki et al. | |
| 2009/0081464 A1 | 3/2009 | Summersgill et al. | |

OTHER PUBLICATIONS

Yuen et al., "Low-Cost Rapid Prototyping of Flexible Microfluidic Devices Using a Desktop Digital Craft Cutter", Lab Chip, vol. 10, pp. 384-387, 2010.

* cited by examiner

*Primary Examiner* — Paul Hyun
(74) *Attorney, Agent, or Firm* — Eileen B. Gallagher

(57) ABSTRACT

A microfluidic flow cell subassembly, which may be assembled into a flow cell having fluidic connections outside of the main substrate, is described for encapsulating a sample to allow for subsequent controlled delivery of reagents to the sample, such as multiplexed in situ biomarker staining and analysis. Methods for fabricating the subassembly and assembled flow cell are also provided. The method includes the steps of adhering a gasket layer to a substrate layer, wherein the gasket layer may contain enclosed features and adhering an adherent layer to the gasket layer. The subassembly may be sealed against a solid support to form a flow cell.

10 Claims, 8 Drawing Sheets

MICROFLUIDIC CHAMBER DEVICE AND FABRICATION

BACKGROUND OF THE INVENTION

The invention relates generally to the fabrication and use of a microfluidic flow cell subassembly for encapsulating a sample to allow for subsequent controlled delivery of reagents to the sample, such as multiplexed in situ biomarker staining and analysis of a mounted biological sample using dye cycling.

For multiplexed in situ biomarker analysis, tissue samples or tissue microarrays (TMA) mounted on glass slides need to be stained with multiple molecular probes to investigate protein expression or spatial distribution quantitatively or qualitatively. The staining and data collection processes are typically performed using time-consuming manual techniques that are susceptible to error. After staining, a coverslip must be placed over the sample in order to keep the sample wet during subsequent imaging (data collection). The coverslip must then be removed before the next round of staining. This process of cover slipping and de-cover slipping can result in loss of the sample or movement of the sample on the glass slide, which confounds downstream analysis. Staining is generally conducted by applying the staining reagent to the sample and letting it sit over the course of a pre-determined incubation. Thus, the staining time is dictated by molecular diffusion of the staining constituents from the bulk solution to the sample. Methods of actively mixing reagents on top of the sample during the incubation aim to ensure uniform staining across the sample and increase interaction between the staining constituents and the sample. However, such methods have a lower limit on reagent volume since they rely on inducing bulk fluid movement without areas of fluid separation that would affect staining uniformity.

Thus, a need exists for a system that can automate the in situ multiplexed biomarker analysis workflow while providing optimal conditions for reagent delivery and data collection. One way to control reagent delivery with small reagent volumes is confine the reagents to an area close to the sample by using a fluidic channel. The diffusion length is determined by the height the channel, and fresh (well-mixed) reagents can be flowed through the channel to maintain the optimal reagent concentration near the sample.

In general microfluidic flow cells are comprised of a gasket layer sandwiched between two substantially flat substrate layers. The gasket layer creates the fluidic channel shape, forms one portion of the channel wall, and typically defines the channel thickness. This gasket can be formed by cutting a defined shape out of a solid material or by printing a material that solidifies on one of the substrates. The two substrates enclose the fluidic channel and serve as the top and bottom channel walls. A leak-proof seal is made by clamping the gasket in between the substrates and/or adhering the gasket to one or both of the substrates.

Furthermore, construction of the flow cell dictates that the fluidic interfaces, inlets and outlets, are formed in at least one of the substrate layers. This limits the choice of substrate materials since holes must be created through the entire substrate thickness without affecting the structural robustness. For instance, drilling holes in a glass coverslip is a time-consuming, costly process since care must be taken to avoid introducing weak points that may propagate cracks.

Thus, a microfluidic flow cell is needed that allows for a wide range of substrate materials and does not require fluidic connections to be made through any of the substrates.

BRIEF DESCRIPTION OF THE INVENTION

The present invention overcomes the aforementioned drawbacks by providing a microfluidic subassembly which may be assembled into a flow cell having fluidic connections outside of the main substrate.

According to one aspect of the present invention the microfluidic subassembly comprises a stacked planar assembly comprising an adherent layer, substrate layer and a gasket and wherein each layer is adhered to one another and the adherent layer and the gasket layer extend beyond the extents of the substrate layer. The subassembly further comprises at least one fluidic port positioned outside the boundaries of the substrate layer.

In accordance with another aspect of the present invention, a microfluidic flow cell is described comprising a solid support adhered to a microfluidic subassembly. The microfluidic subassembly comprises a stacked planar assembly comprising an adherent layer, substrate layer and a gasket and wherein each layer is adhered to one another and the adherent layer and the gasket layer extend beyond the extents of the substrate layer. The subassembly further comprises at least one fluidic port positioned outside the boundaries of the substrate layer.

In accordance with yet another aspect of the present invention, a method of fabricating a microfluidic subassembly is described. The method comprises the steps of, adhering a gasket layer to a substrate layer wherein the gasket layer may contain enclosed features to be used as one or more fluidic ports, adhering an adherent layer to the gasket layer and substrate layer wherein the adherent layer and gasket layer extend beyond the extents of the substrate layer, and optionally trimming at least one of the gasket layer and adherent layer to predetermined dimensions. The method further comprises optionally creating at least one fluidic port by creating a hole in the outer boundary of gasket layer.

In still another embodiment, a method of fabricating a microfluidic flow cell is described. The method comprises the steps of fabricating a microfluidic subassembly by adhering a gasket layer to a substrate layer wherein the gasket layer may contain enclosed features to be used as fluidic inlets, adhering an adherent layer to the gasket layer and substrate layer wherein the adherent layer and gasket layer extend beyond the extents of the substrate layer, and optionally trimming at least one of the gasket layer and adherent layer to predetermined dimensions. The method further comprises optionally creating one or more fluidic ports and adhering the subassembly to a solid support.

Various other features and advantages of the present invention will be made apparent from the following detailed description and the drawings.

BRIEF DESCRIPTION OF THE DRAWINGS

The drawings illustrate an embodiment presently contemplated for carrying out the invention.

DETAILED DESCRIPTION OF THE INVENTION

Figure 1A:
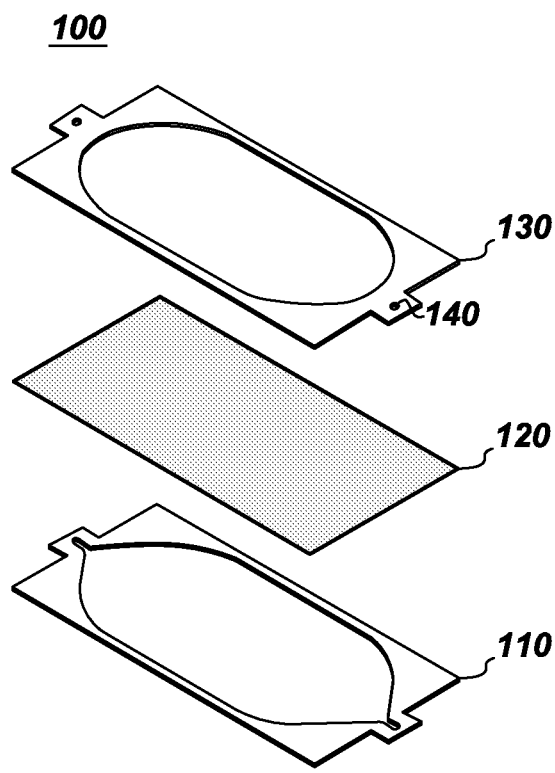
FIG. 1 is schematic diagram of a representative subassembly showing a stacked planner assembly; unassembled (A), viewed from the gasket side (B) and viewed from the adherent layer side (C).

To more clearly and concisely describe and point out the subject matter of the claimed invention, the following definitions are provide for specific terms, which are used in the following description and the appended claims.

The singular forms "a" "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Unless otherwise indicated, all numbers expressing quantities of ingredients, properties such as molecular weight, reaction conditions, so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least each numerical parameter should at least be construed in light of the number of reported significant digits and by applying ordinary rounding techniques As used herein, the term "biological sample" refers to a sample obtained from a biological subject, including sample of biological tissue or fluid origin obtained in vivo or in vitro. Such samples may be, but are not limited to, a whole cell, tissues, fractions, and cells isolated from mammals including, humans, blood samples in whole or in part, as well as other biological fluids. The biological sample may be mounted or fixed onto a solid support for example a tissue section or blood smear fixed to a microscope slide or a tissue microarray or may be introduced into the flow cell after adhering the subassembly to the solid support.

As used herein, the term "consumable" refers to a disposable component that is designed for a single or limited use. In some situations the consumable may have a useful life that is less than that of the system with which it is used in, in other situations, the consumable may be a part, stored and manufactured separate from the system for which it is intended to be used.

In certain embodiments, the microfluidic subassembly provides a means of encapsulating a biological sample, so that it can sequentially be: stained with a dye, imaged with any high resolution microscope, the fluorescent reporter inactivated or quenched, then the cycle repeated. As used herein the microfluidic subassembly may also be referred to as a microfluidic chamber as it creates a chamber in the center of an assembled flow cell. As used herein the microfluidic subassembly may also be referred to as a subassembly. In certain embodiments, the subassembly is consumable such that the subassembly is designed for a single or limited use.

The subassembly device provides a means of encapsulating a sample within a chamber. In certain embodiments the sample is a biological sample mounted on a solid support such as a standard glass microscope slide allowing the sample to be maintained in a controlled environment during subsequent processing steps. The biological sample may be positioned on the solid support prior to encapsulation with the subassembly device which results in the formation of a flow cell. In certain embodiment, the biological sample may include, but is not limited to a whole cell, a tissue section, or a blood sample. In certain embodiments, the flow cell comprising the subassembly may be consumable such that the subassembly is permanently attached to the solid support for real time or near real time analysis. In certain embodiments, the flow cell as assembled may also serve to archive the sample for future testing or analysis.

The biological sample may also be attached to the solid support after flow cell formation by flowing it into the cell and trapping it via chemical means, electrostatic interactions, non-specific adsorption, dielectrophoretic forces, magnetic force, optical tweezers, physical entrapment by microstructures, or similar means. In certain embodiments, the flow cell containing the encapsulated sample may be archived intact for analysis at a later time.

In one embodiment the microfluidic flow cell formed using the subassembly does not need to be physically clamped to maintain a seal to the solid support or maintain the integrity of that seal.

In certain embodiments, the contents of the flow cell may be analyzed in-situ, using various optical, electrical, magnetic, or electromechanical devices in communication with the flow cell. In another embodiment, substances may be transported out of the flow cell for subsequent analysis. In one embodiment, the flow cell is used for multiplexed tissue staining and imaging as described in US patent application US2009253163A1, and U.S. Pat. No. 7,629,125.

Figure 1B:
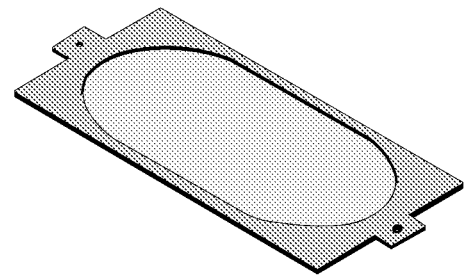
Figure 1C:
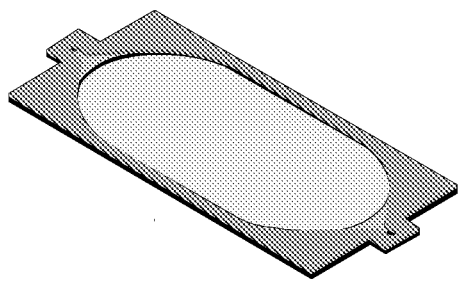

A representative embodiment of the subassembly is shown in FIGS. 1A and 1B and 1C. The subassembly device (100) consists of a stacked planar assembly comprising an adherent layer (110) a substrate layer (120), and a gasket layer (130) wherein the gasket layer and the adhesive layer are extended beyond the substrate layer. The layers are adhered together and have holes positioned along the outer boundary of the adherent layer and gasket layer to form fluidic inlet/outlet ports (140). A fluidic inlet/outlet port may also be referred to herein as a port. FIG. 1B shows the subassembly viewed from the gasket (130) side and FIG. 1C shows the subassembly viewed from the adherent layer (110) side.

Figure 2A:
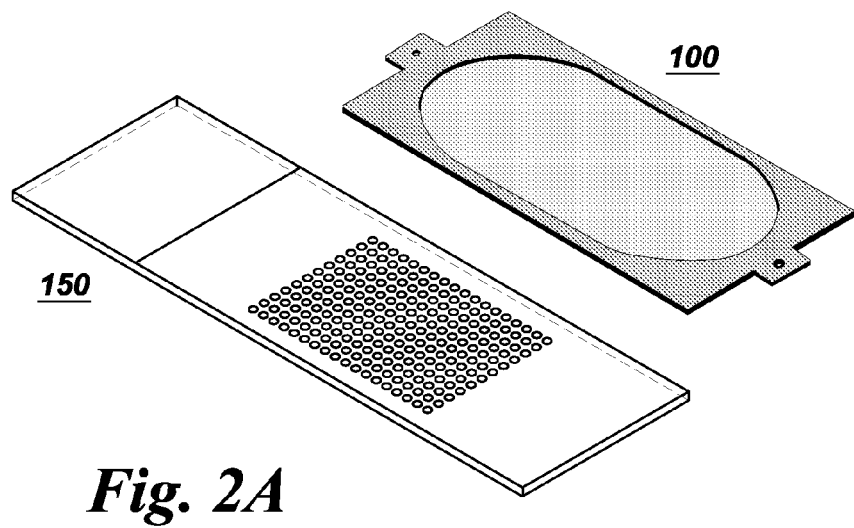
FIG. 2 is a schematic diagram of an assembled flow cell: (160) comprising the subassembly (100) adhered to a solid support (150); unassembled (A), viewed from the subassembly side (B) and viewed from the solid support side (C).
Figure 2B:
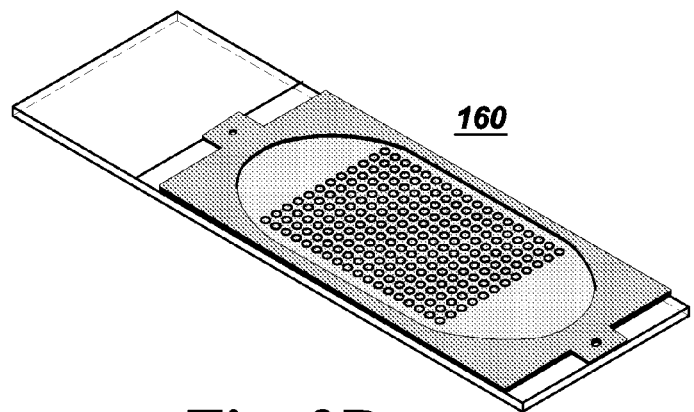
Figure 2C:
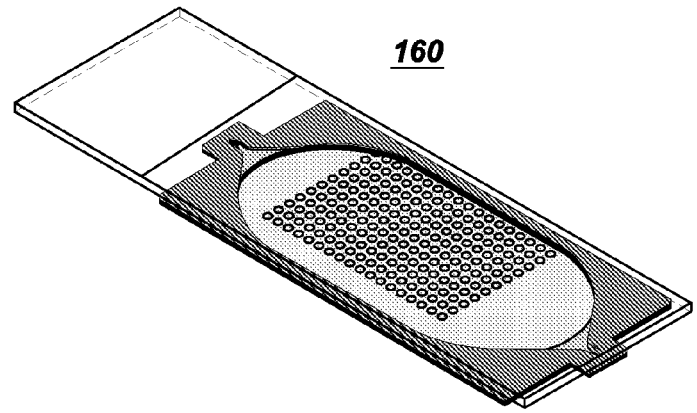

The subassembly (100) is capable of adhering to a solid support (150) as shown in FIG. 2A. Adhering the subassembly effectively forms a microfluidic flow cell (160) sealed along its entire boundary. This is shown further in FIGS. 2B and 2C which shows the assembled flow cells from both sides, FIG. 2B is the flow cell depicted from the gasket side while 2C is depicted from the solid support side. In some embodiments, the total thickness of the subassembly may be designed to be about 25 to about 1200 µm, which is the combined thickness of the gasket between about 20 to about 1000 µm and the adherent layer between about 5 and about 200 µm.

As used herein the term "adhered together" or "capable of adhering" refers to joining components or materials together to form a seal at the interface of the materials. Adhering may refer to the use of a chemical adhesive to form a bond, wherein the chemical adhesive includes but is not limited to silicones, epoxies, acrylics, room temperature vulcanizing materials (RTVs), thermoplastics, or a combination thereof. Adhering may also be accomplished by overmolding one material over another to create a seal due to mechanical or chemical interactions at the interface of the two materials. In certain embodiments adhering may be accomplished through the application of external conditions such as pressure, temperature, or exposure to light or radiation. Adhering may result in a strong bond at the interface such that cohesive failure occurs at separation. In other cases, adhering may result in a bond at the interface which may be broken with a minimum amount of force such that the interface may be repositioned or the bond may be considered a temporary bond.

In certain embodiments, the solid support supports a fixed biological sample such that the sample is encapsulated by the resulting flow cell. The fluidic inlet/outlet ports (140) are configured to extend beyond the substrate (120) such that through-holes are not required in either the substrate (120) or the solid support (150).

In certain embodiments, the adherent material has an adhesive property and comprises a chemical adhesive such as, but not limited to, silicones, acrylics, epoxies, room temperature vulcanizing materials (RTVs), thermoplastics, or a combination thereof. In certain other embodiments, the adherent material may be an adhesive tape, silicone, thermoplastic elastomer, paraffin wax, printed adhesive material, or plastic film. In still other embodiments the adherent material may be an optical, thermal, or pressure sensitive adhesive wherein the application of light, heat or pressure enhances adherence.

In certain embodiments the substrate material may be comprised of glass, but may also be comprised of plastic, metal, silicon, ceramic, silicone or a combination thereof. In certain embodiments, the substrate is a glass coverslip. The height of the assembled flow cell may be determined by the thickness of the adherent material itself, or by incorporating spacers during the assembly process.

Fluidic inlets and outlets ports are made by extending the adherent material beyond the edge of the substrate. In certain embodiments, the adherent material outside of the substrate may be capped by the gasket material. The gasket material may be composed of, but not limited to, silicone, thermoplastic elastomer, adhesive tape, rubber, or plastic. Fluidic inlets and outlets ports may be comprised of through-holes present in the gasket material such that the ports are integral to the gasket structure. In still other embodiments, the port may be a different material than the gasket layer and is incorporated into the gasket to provide openings through the layer.

Figure 3A:
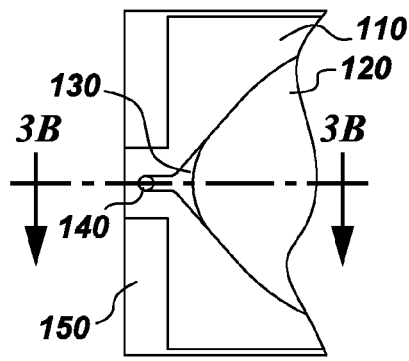
FIG. 3 is a schematic diagram of the gasket layer positioned over the adherent layer (A), without applied compression force (B) and with applied force (C) resulting in sealing the gasket against the solid support.
Figure 3B:
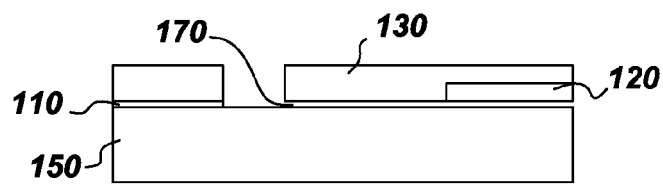
Figure 3C:
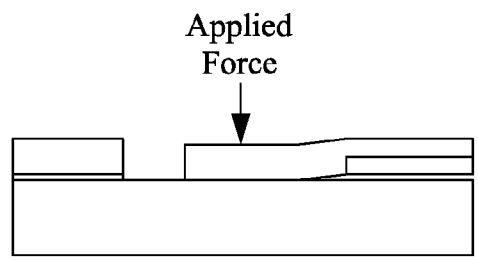

Fluid flow may be controlled by deforming the gasket material. This may be accomplished as shown in FIG. 3A wherein the gasket (130) is positioned over a fluidic channel (170) in the adherent layer (110). The gasket positioned over the channel in the adherent layer (FIG. 3B) deforms under applied force, reducing the channel height and increasing the flow resistance. Flow may be stopped or restricted by sealing the gasket against the solid support (FIG. 3C). This flow control valve would function in the same way regardless of whether or not there is a fluidic port in the gasket. In certain embodiments the force may be applied by positioning the device in a fluidic connection fixture in a plug-and-play fashion.

In still other embodiments, the subassembly may be designed to allow for alternative fluidic connections. One port that serves as a single connection may be used, while other designs may allow for multiple inlet and outlet ports. In other embodiments, the port may interface with flow channels used to direct or control flow In certain embodiments, the gasket layer (130) may act as a valve to block the flow of reagents between the ports (140) and the assembled flow cell (160) and provide isolation of the contents within the flow cell. The valve is closed by deforming the gasket so that it contacts the solid support (150) in the channel area (170) between the substrate and the port (140). This deformation can be induced by methods including, but not limited to, movement of a solid structure pushing against the gasket, and pneumatic pressure applied locally to a specified portion of the gasket. Other methods of deforming the gasket and sealing it against the solid support may also be used.

Figure 4A:
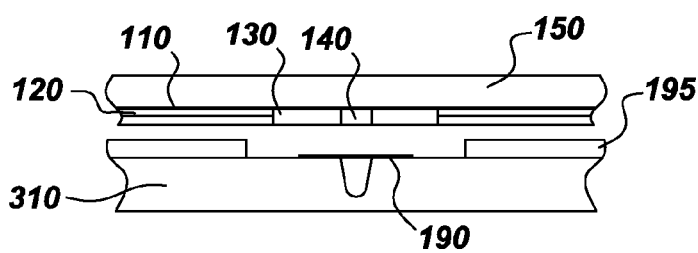
FIG. 4 is schematic diagram of a raised sealing surface without applied compression force (A) and with applied force (B) resulting in a seal.
Figure 4B:
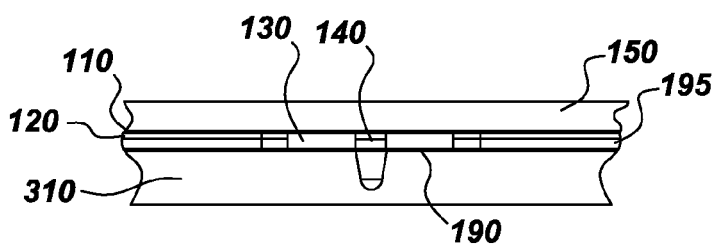

FIG. 4A shows one embodiment wherein the fluidic connection may be accomplished wherein the fluidic connection fixtures is a raised ring or sealing device fixture (200). As shown contacting the microfluidic flow cell against the raised sealing surface (190) forms a seal to the gasket layer (FIG. 4B). A ledge (195) on the fixture may limit the gasket compression distance and provide a level surface on which to register the solid support to an external entity such as a microscope objective of an imaging device.

Figure 5A:
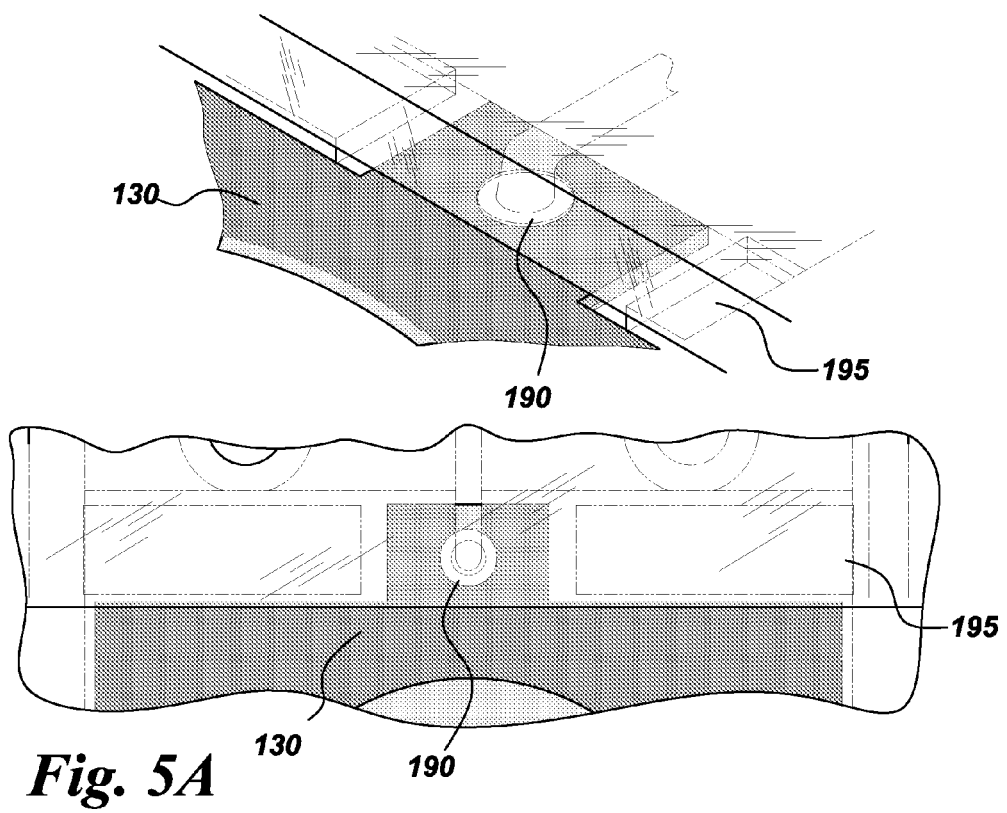
FIG. 5A is a schematic diagram showing a detailed view of a fluidic connection with the gasket layer positioned against the raised surface.

FIG. 5A is one representation of the raised sealing device showing the gasket (130) and the ledge (195) in more detail. The gasket (130) is positioned against the raised surface.

In certain embodiments, the amount of compression is determined by the gasket thickness and the distance between the raises seal and the ledge. For example if the total thickness of the assembled flow cell is approximately 525 µm while distance between the seal and the ledge is approximately 500 µm, the compression distance is designed to be approximately 25 µm.

Figure 5B:
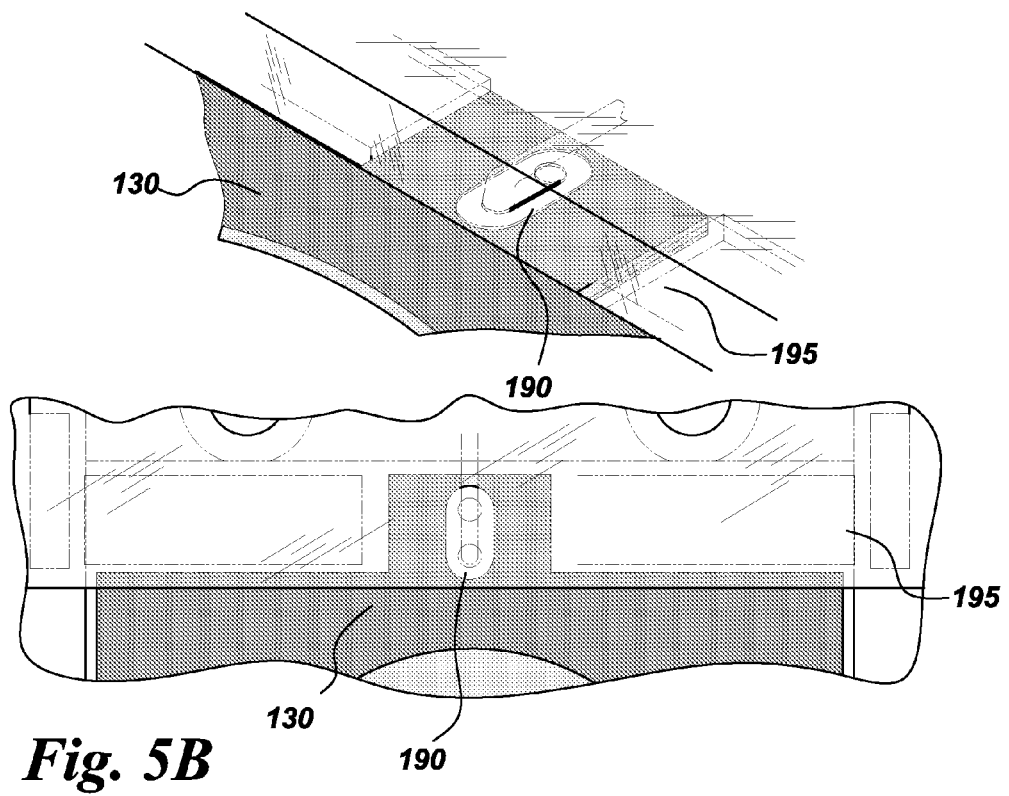
FIG. 5B is schematic diagram showing a detailed view of a fluidic connection with the gasket layer positioned against the raised surface and creating a fluidic channel with the gasket as a bottom surface.

In another embodiment the compression tolerance may be reduced by forming a seal that completely surrounds the gasket area above the channel formed in the adherent layer (FIG. 5B), which prevents the gasket from deflecting towards the solid support. This is illustrated in FIG. 5B wherein the flow channel may be formed with the gasket layer (130) as the bottom surface This allows for variable compression due to tolerances in manufacturing without adversely affecting the flow resistance of the connector.

In certain embodiments, the gasket is designed to be compressed by at least 5 µm and no more than 30 µm. In other embodiments, the compression distance is designed to be at least 5 µm but the maximum distance may be up to 200 µm if the compression does not deform the gasket. As represented to make a robust seal between the gasket and fluidic connector, it is desirable that the gasket be compressed by a distance greater than the surface roughness/variation of the gasket. In some embodiments, the gasket should not be compressed so much that it deforms and seals against the solid support surface (blocking off the channel extending beyond the substrate). The gasket compression should preferably be less than half the channel height. Assuming the gasket surface roughness is <1 µm after molding using a very smooth master mold, the thickness/surface variation is the dominant parameter. Variation in the gasket thickness may be on the order of ±5-10 µm, and a similar tolerance is expected of the step size of the fluidic connector. In certain embodiments, the target gasket may be defined as 25 µm±12.5 µm.

Figure 6:
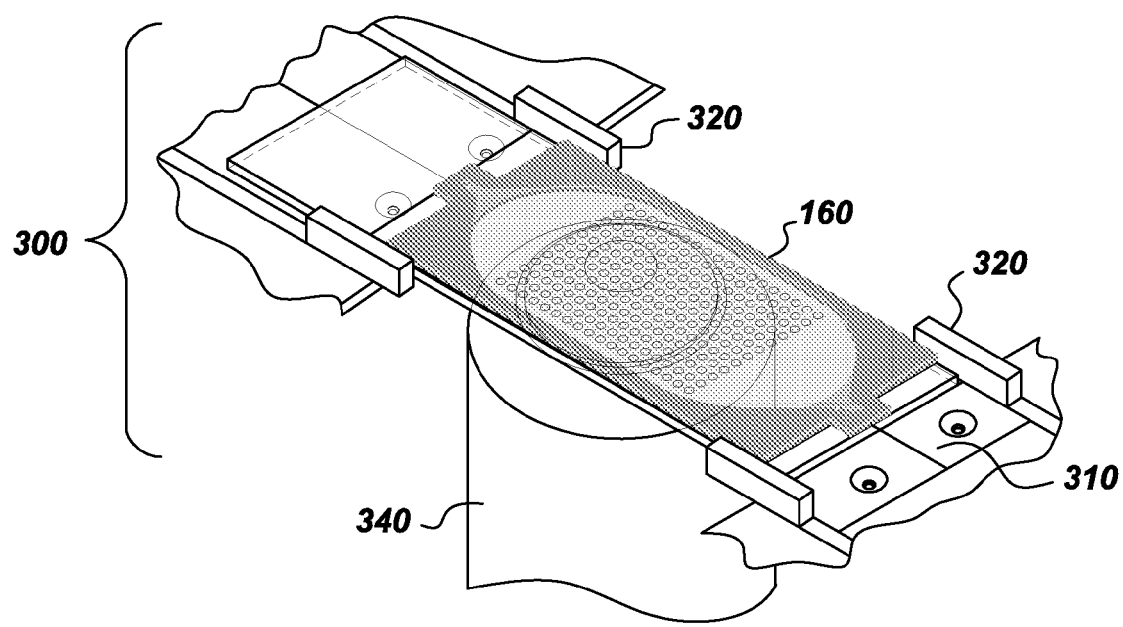
FIG. 6 is a schematic diagram showing an assembled flow cell mated with fluidic connectors mounted in a fixture and positioned in relationship to a microscope objective.

In certain embodiments the flow cell may be mated with fluidic connectors mounted in a fixture (300). As shown in FIG. 6 fluidic connectors such as a channel (310) may be external to the assembled flow cell (160) and guides (320) or similar external appendages on the fixture (300) may be used to align the flow cell with the fluidic connector. The use of a fixture may ensure alignment between the flow cell and an external entity, such as a microscope objective (340).

In certain embodiments, a port is an insert, made from plastic or metal, which may be fitted into the gasket to form inlet and outlet connections. In certain embodiments the connector may be integrally molded into the gasket. In still other embodiments, the insert may be positioned using an insertion tool or may be part of a plug through hole with a connector assembly.

As such, the design, rather than incorporating holes in the substrate for the fluidic connections, allows the fluidic inlet and outlet ports are located outside of the substrate area. This design choice avoids having to drill holes in the substrate that might introduce weak points for crack initiation and propagation in some materials, such as glass. In still another embodiment a port (made from e.g., plastic or metal) may be integrally molded in the gasket during fabrication such that a compression-type connection is not necessary.

The assembled flow cell may be configured in such a way that it may be inserted and removed from a fluidic system with little effort such that there is no need for a complex fluidic connection scheme.

In certain embodiments, the solid support (150) may contain a biological sample. In certain embodiments, the bond strength of the subassembly (100) to the substrate (150) may be sufficient such that the assembled device (160) need not to be clamped to maintain a seal. The required bond strength may depend on the pressure drop generated under normal flow conditions, flexibility of the substrate and the solid support, normal operating temperature, and chemicals that come in contact with the subassembly materials and solid support.

The required height of the subassembly (100) and the related assembled flow cell (160) may be determined based on the thickness of the sample. Where the sample is a tissue section, it may have a thickness between about 1 µm to about 100 µm. In some embodiments, the tissue section may occupy up to a 25 mm by 50 mm area. This results in a small internal cell volume or holding capacity of the subassembly in the range of 1 µL to 1000 µL, preferably, 25 µL to 200 µL determined by the subassembly dimensions. The subassembly may be designed differently for different sample dimensions to minimize the internal cell volume while still enclosing the sample.

If the subassembly (100) is mechanically flexible, it may bend when fluid flows through the assembled flow cell. The source of the mechanical flexibility may be from the adherent layer, gasket, the substrate, or a combination thereof. For example, in certain embodiments, the substrate may be a non-rigid flexible polymer film. In other embodiments, the gasket may be over molded on to a glass cover slip, whereby the glass cover slip is the substrate. As such, in certain embodiments, the gasket and the cover slip are able to function as a flexible material layer. When flow is induced with positive pressure, the flexible material layer will bend away from the solid support and effectively create a larger chamber volume in the center of the flow cell. In these instances, the flow resistance will be smaller in the center and more of the flow will occur in the center. When flow is induced with negative pressure, the flexible material layer will bend towards the solid support and effectively create a smaller chamber volume in the center of the flow cell. This means that the outer edges of the flow cell will have the lower flow resistance and more of the flow will occur in these areas. As such the flexible material may function as a flow controller. In certain embodiments, the solid support may be flexible and functional in a similar fashion.

This switchable flow resistance may be used to ensure uniform fluid delivery across the entire flow cell by flowing back and forth with sequential positive and negative pressures. Fluid would flow preferentially in the center area of the flow cell followed by preferential flow in the outer edges of the cell. This is especially useful for molecular pathology application where tissue staining is conducted with a very wide flow cell and where uniform staining is important.

The switchable flow resistance may also be used to ensure air bubbles do not enter the center of the flow cell. For example, when making a fluidic connection between the flow cell and fluidic delivery system, air can be introduced at the connection interface. By flowing with negative pressure after making such a connection, any air in the system will flow along the outer edges of the flow cell and then exit the cell. If the substrate was not flexible, the air may enter the center of the flow cell and may get trapped, depending on the cell dimensions and flow characteristics. These air bubbles may obstruct the fluid flow and prevent uniform fluid delivery to contents within the cell.

Furthermore, using a mechanically flexible material, variation in flow resistance across the flow cell can be modulated to achieve more uniform fluid delivery as well as preferential flow to facilitate priming the system and preventing air entrapment in the cell.

In certain embodiments, the assembled flow cell (160) may be interfaced with a plastic cartridge that may house the fluids or dried reagents to be re-hydrated, that will be flowed into the chamber. In certain molecular pathology application, such a reagent cartridge may be used to house a specified panel of pre-packaged biomarkers for a particular test. The cartridge may also be designed to allow the addition of custom reagents by the user.

In certain embodiments, one or both of the substrate (120) and the solid support (150) are optically transparent in a specified range of wavelengths. As such, optical analysis of materials/structures within the flow cell may be accomplished by either epi-illumination, or transmitted illumination if both are transparent. In the embodiment wherein the assembled flow cell may be used for multiplexed tissue staining and analysis, using both a transparent substrate and solid support allows for both epi-fluorescence imaging and transmitted brightfield imaging. This enables analysis of fluorescence-based molecular pathology as well as conventional brightfield imaging based on, for example, diaminobenzidine (DAB) staining or hematoxylin and eosin stain (H&E) chromogenic staining.

Figure 7A:
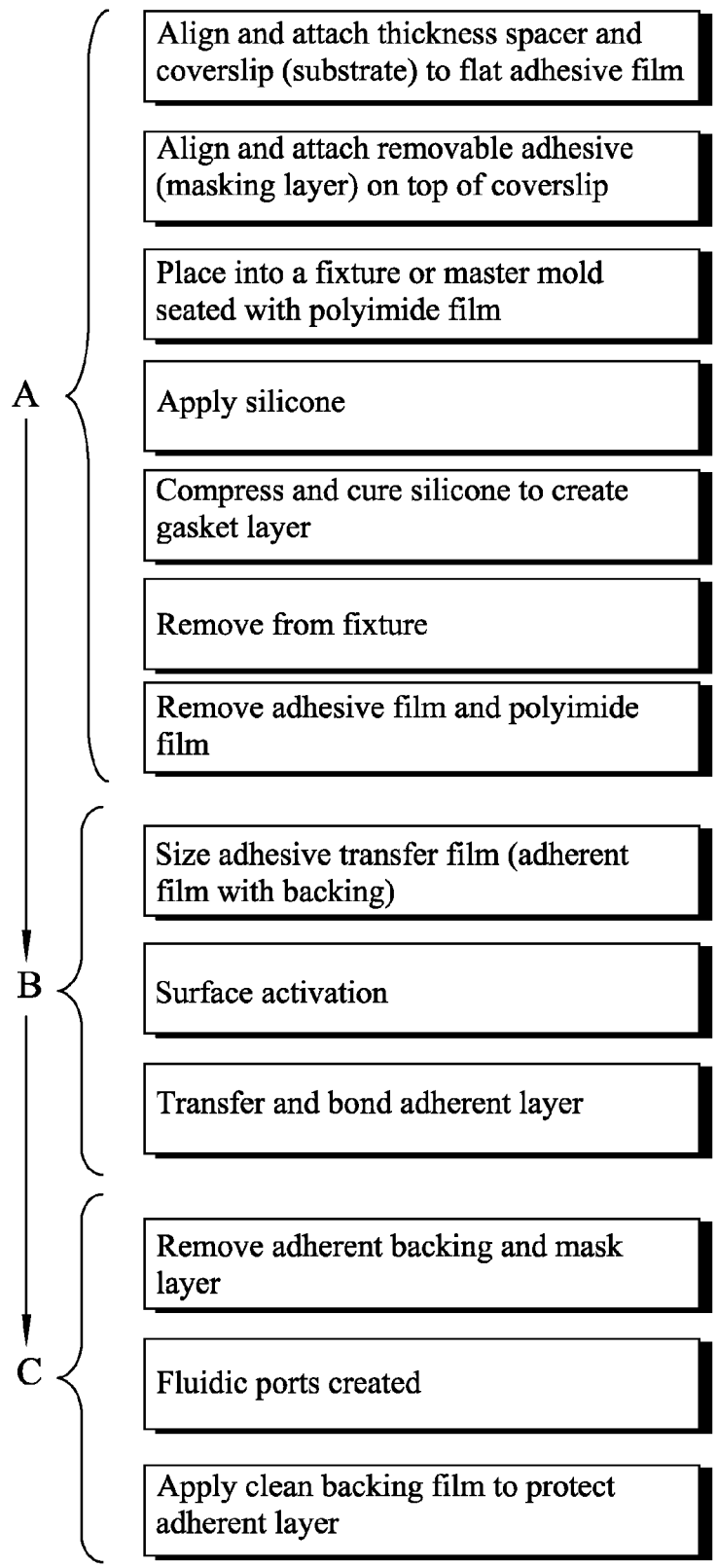
FIG. 7A is a process flow diagram representing a subassembly fabrication process.
Figure 7B:
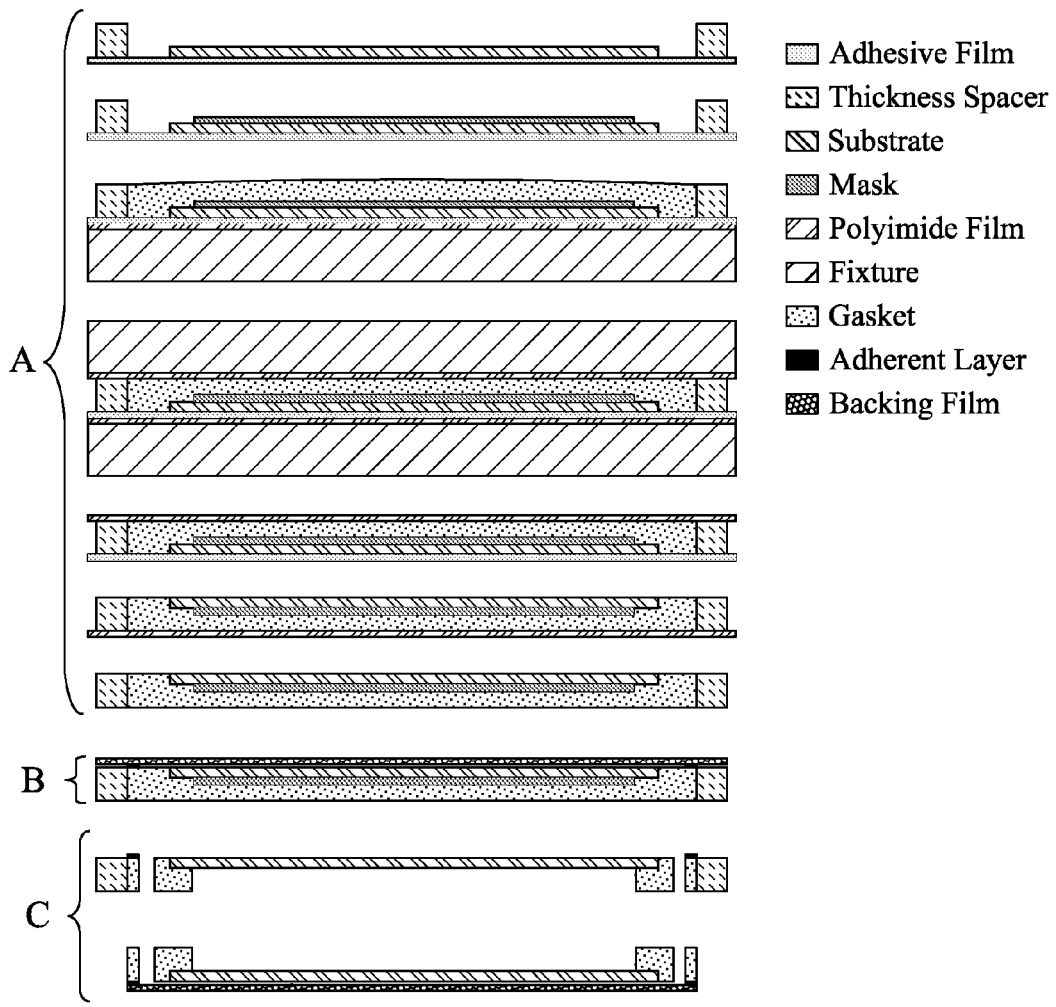
FIG. 7B is a schematic structure showing the subassembly components during the fabrication process.

In one embodiment, a method of fabricating the subassembly is disclosed. The method generally comprises overmolding a gasket onto a substrate, such as a glass cover slip (step A), attaching an adherent material to the gasket (step B), trimming the gasket and/or the adherent material and providing inlet/outlet ports (step C). FIG. 7A is a flow diagram of one such embodiment. FIG. 7B depicts the layer structure of the subassembly during the process steps.

As shown in FIG. 7, step A comprises overmolding a gasket, such as a silicone elastomer (silicone), to the substrate. The step allows for molding the gasket to a predetermined thickness around the substrate and creating a robust bond. In certain embodiments the gasket and substrate are flat and coplanar and the gasket thickness is greater than the substrate thickness.

In certain embodiments, as shown further FIG. 7, step A may be accomplished by further using a thickness spacer comprising a polymer, adhesive transfer tape, metal, glass, or a combination thereof. For example a polyimide and adhesive transfer tape stack with a specific thickness (approximately 500 µm for example) may be used to define the thickness of the silicone during overmolding to allow for a predetermined tolerance. In certain embodiments, the tolerance may be ±10 µm. In other embodiments, the tolerance may ±6.25 µm, in still other embodiments; the tolerance may be ±5 µm. In certain embodiments, it may be desirable to ensure that the spacer is uniformly assembled without any trapped air bubbles. Polyimide and adhesive transfer tape may be used since these materials are commercially available with tight thickness tolerances. The thickness spacer may be built by laminating one layer of 250±12.5 µm thick polyimide, two layers of 50±5 µm thick adhesive transfer tape, one layer of 25±2.5 µm thick polyimide, and one layer of 125±12.5 µm thick polyimide. The maximum thickness variation of the laminated spacer is expected to be ±50 µm, but in practice the variation is typically ±5-10 µm.

In certain embodiments, a glass cover slip may be first attached to a removable adhesive film at a predetermined location to prevent gasket material from contacting what will become the inner surface of the flow cell. For example in certain embodiments an adhesive film such as Nunc® well plate sealing film (Thermo Scientific Waltham, Mass.) may be cut to the desired shape using a cutting plotter. The adhesive film may be cut in such a way as to prevent the film from sticking to other portions of the assembly fixture by leaving a non-adhesive backing in place while allowing exposure of the adhesive in the inner portion to hold the cover slip. Holes may be cut for alignment purposes. The thickness spacer may be attached to the adhesive film in an alignment fixture, and the spacer may be designed in such a way that it accepts the substrate in a specific orientation to prevent it from moving during the subsequent process steps. In certain embodiments, an automated robotic system may place the substrate into the fixture or master mold. A master mold assembly may be designed to accept the substrate in a specific orientation to prevent the substrate from moving during the subsequent process steps.

In certain embodiments the individual spacer layers may be cut to shape using a blade cutting process such as a knife edge or die cutting, laser machining, or mechanical milling. The final spacer structure may be created via lamination. In certain other embodiments, the spacer may be created out of metal via machining processes to a predetermined tolerance. In an alternative embodiment, the same spacer structure may be an integral part of a metal master used to over mold the gasket via an injection molding process.

In certain embodiments, a masking layer may then be applied to the substrate. The masking layer may be used to prevent the gasket from adhering to the substrate in areas where there will be a direct optical interface in the final device. In certain embodiments, a low adhesion adhesive tape may be used as a masking layer, which is removed from the substrate after forming the subassembly. The mask layer may be trimmed or cut using a template or robotic type cutting using for example die cutting, laser, or similar method to provide holes for insertion into an alignment fixture.

In certain embodiments, the gasket layer is prevented from adhering to certain areas of the substrate by holding the substrate against a substantially flat support made from materials including, but not limited to, metal, silicone elastomer, plastic, or glass.

In certain embodiments, over molding of the gasket on to the substrate may then be conducted between two metal plates to ensure a uniform gasket thickness. In certain embodiments, a mechanical alignment fixture is not required during the molding step. In certain embodiments, to provide a smooth gasket surface, a high quality polymer film, such as polyimide, may be used as the mold surface. For example a polyimide film may be used on top of one of the metal plates. The film may also serve as a barrier to the gasket material that may leak through the alignment holes. In certain embodiments, a master mold having an integral thickness spacer is pressed against a second master during molding to ensure uniform gasket thickness.

After the overmolding of the gasket on to the substrate, such as a glass cover slip, an adherent material, such as an adhesive film or adhesive transfer tape, is bonded to the structure (step B). This adherent layer functions to bind or adhere to the subassembly to the solid support while defining the flow path of fluids within the assembled flow cell.

In certain embodiments, step B comprises defining the dimensions of the flow cell by sizing and cutting the adherent layer, such as an adhesive transfer tape, to the desired dimension. The flow path is defined by the shape of the feature cut in adhesive transfer tape. In certain embodiments, the adherent layer may be sized using a cutting plotter or die cutting and excess adhesive may be removed manually or with an automated assembly. In order to bond the adherent layer to the gasket and substrate with sufficient bond strength, the surfaces may be activated or treated to improve adherence. In certain embodiments surface activation may include, but is not limited to heat, chemical, gas plasma treatment or a combination thereof. For example, in one embodiment, the adherent layer, substrate, and gasket are air plasma treated prior to adhering.

After surface treatment, the adherent layer, gasket, and substrate, may be brought together and heated under pressure to ensure sufficient bond strength. For example, in one embodiment, the adhesive transfer tape is placed onto the posts of the bottom portion of a mechanical alignment fixture, adhesive side up, and a vacuum applied to hold it in place. The glass/silicone assembly may then be lowered onto the posts of the bottom portion of the fixture, glass side down. The upper portion of the assembly fixture may be placed onto the posts of the lower portion, and repositioned until contact is made with the adhesive. Moderate force may be applied to the top fixture for a short time (approximately 30 seconds) to make an initial bond. The bonded part may then be removed from the alignment fixture. The partially assembled subassembly may be placed, silicone side down and moderate pressure applied to the backing side of the structure to ensure a sufficient bond. The backing layer may be removed and fresh backing, which has not been exposed to plasma, attached to the adhesive and silicone sides. Heat and pressure may then be applied to ensure a sufficient bond.

In the last step in the assembly process, step C; the mask layer may be removed, excess gasket trimmed and fluidic ports created in the gasket. The mask may be removed manually or with an automated assembly. A punch may be used to cut holes through the gasket at the end of the channels in the adherent layer outside of the substrate.

Figure 8:
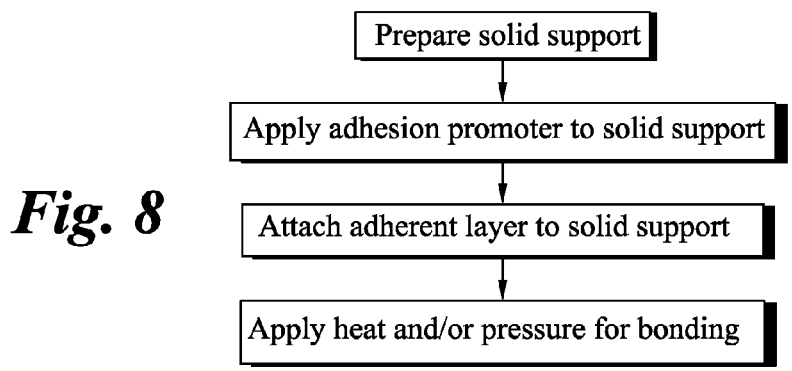
FIG. 8 is a process flow diagram representing an assembled flow cell fabrication process.

In certain embodiments, the subassembly is then bonded to the solid support to construct a flow cell as depicted in FIG. 8. In certain embodiments, the method involves attaching the adherent layer to the solid support such that a sample, mounted or fixed to the solid support, is encapsulated. This encapsulation may be performed by an automated method in some embodiments. As a further step, in certain embodiments, prior to encapsulation, the solid support may be chemically cleaned and a chemical adhesion promoter may be applied. After encapsulation the bond may be further strengthened by optionally applying heat and/or pressure for a predetermined amount of time. In certain embodiments, if a clean backing layer was employed in forming the subassembly to protect the flow cell, the backing layer is removed to expose the adherent layer.

Referring again to FIG. 3, FIG. 3 shows one such subassembly designed using an embodiment of the method of fabrication and alternative views of the assembled flow cell. The fluidic channel is defined by the adherent layer and extends beyond a substrate (for example a standard 24 mm×50 mm cover slip, not shown) at either end where ports are located for making fluidic connections. As viewed from the gasket side (FIG. 3B) the gasket at either end serves the purpose of making fluidic connections. The gasket material may extend on top of the substrate to facilitate the flow cell assembly to the solid support. (middle section). The distance between the surfaces where the solid support rests on the connector and the top of the raised structure may define the gasket compression distance. In some embodiments, the gasket is designed to be compressed by at least 5 µm and no more than 30 µm. In other embodiments, the compression distance is designed to be at least 5 µm but the maximum distance may be up to 200 µm if the compression does not deform the gasket. As represented to make a robust seal between the gasket and fluidic connector, it is desirable that the gasket be compressed by a distance greater than the surface roughness/variation of the gasket. In some embodiments, the gasket should not be compressed so much that it deforms and seals against the solid support surface (blocking off the channel extending beyond the substrate). The gasket compression should preferably be less than half the channel height. If we assume the gasket surface roughness is <1 µm after molding using a very smooth master mold, the thickness/surface variation is the dominant parameter. Variation in the gasket thickness may be on the order of ±5-10 µm, and a similar tolerance is expected of the step size of the fluidic connector. Assuming a well-controlled process, the target gasket may be defined as 25 µm±12.5 µm.

Figure 9:
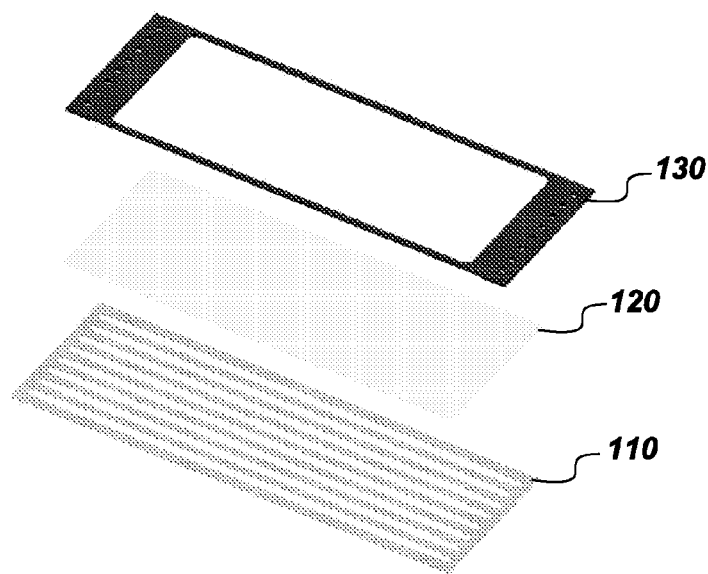
FIG. 9 is a schematic diagram of an assembled flow cell using alternative designs of the gasket and adherent layers.
Figure 9:
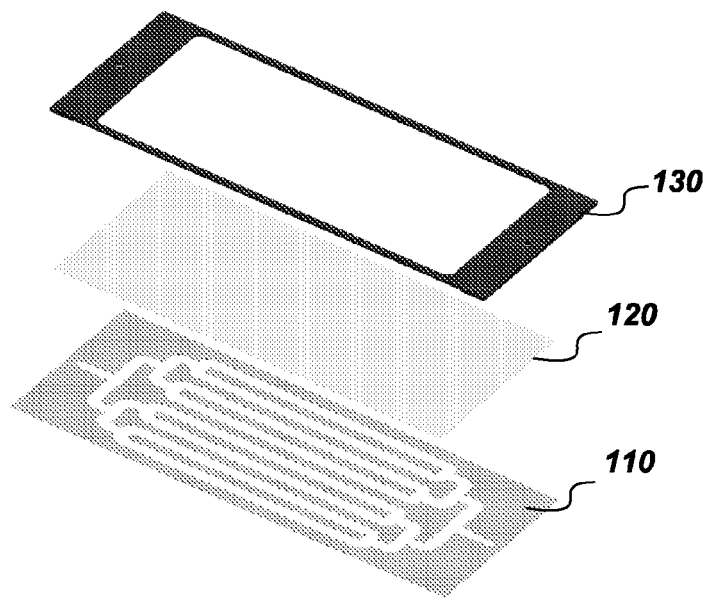

Other flow cells may be fabricated using the fabrication process to provide flow cells with different dimensions. The flow cell is defined by the internal shape of the adherent layer. The flow cell may be defined by the size of the substrate and the fluidic channels in the adherent layer and/or gasket that extend beyond either end of the substrate. FIG. 9 shows examples of other flow cells with alternative designs based on changes in the various layers most notably the gasket (130) and adherent layer (110).

In certain embodiments the assembled flow cell comprises a subassembly and a solid support wherein the solid support is supporting a biological sample. The sample is fully encapsulated by the subassembly bonded to the solid support. In certain embodiments the adhering results in the subassembly being permanently or semi-permanently attached to the solid support whereby removal of the subassembly consumes the flow cell design and may require assembly of a new flow cell for further analysis of the sample. The simple device structure enables low cost manufacturing such that the flow cell need not be reusable but may be a consumable component that remains affixed to a single solid support.

In certain embodiments, the resulting flow cell encapsulating the biological sample may be exposed to a variety of reagents and imaging processes. In certain embodiments, the flow cell containing the encapsulated sample may be archived intact for analysis at a later time or for post analysis after initial processing. In other embodiments the subassembly may adhere to a solid support supporting a material other than a biological sample. For example, the solid support may contain, but is not limited to, a chemical material, a mechanical structure, or combination thereof. In certain embodiments the material may be surface-bound chemicals, polymers, and mechanical structures such as, but not limited to micro-electromechanical sensors, actuators and flow obstructions elements. The resulting microfluidic flow cell may then be used in analysis or functioning of the contained materials.

The present invention has been described in terms of the preferred embodiment, and it is recognized that equivalents, alternatives, and modifications, aside from those expressly stated, are possible and within the scope of the appending claims.

What is claimed is:
1. A microfluidic flow cell comprising:
a microfluidic subassembly comprising:
a stacked planar assembly comprising;
an adherent layer;
a substrate layer; and
a gasket layer;
wherein each layer is adhered to one another; and
the adherent layer and the gasket layer extend beyond the extents of the substrate layer;
at least one fluidic port wherein said port is positioned outside the boundaries of the substrate layer; where
the at least one fluidic port is aligned with at least one fluidic channel; and
the at least one fluidic port is through-hole of the gasket layer, and insert positioned in the gasket layer, or a combination thereof; and
the gasket layer acts as a valve to control fluid flow through the fluidic port; and
a solid support adhered to the microfluidic flow cell subassembly.

2. The flow cell of claim 1 wherein the holding capacity of the flowcell is in the range of 1 µL to 1000 µL.

3. The flow cell of claim 2 wherein the holding capacity is in the range of 25 µL to 250 µL.

4. The flow cell of claim 1 wherein the fluidic channel is positioned within the adherent layer.

5. The flow cell of claim 4 further comprising a seal surrounding the gasket layer adjacent to the fluidic channel.

6. The flow cell of claim 1 wherein the gasket layer extends beyond the extents of the substrate layer and further wraps around the edges of the substrate layer to form a seal.

7. The flow cell of claim 1 wherein the solid support supports a biological sample.

8. The flow cell of claim 1 further comprising a fluidic connector interfaced with the fluidic port and is capable of connecting to a fluid delivery system.

9. The flow cell of claim 8 wherein the fluidic connector comprises a raised structure configured to contact with the solid support.

10. The flow cell of claim 8 wherein the fluidic connector comprises at least one attachment point configured to match attachment points of an imaging device stage.

\* \* \* \* \*